Figure 1:
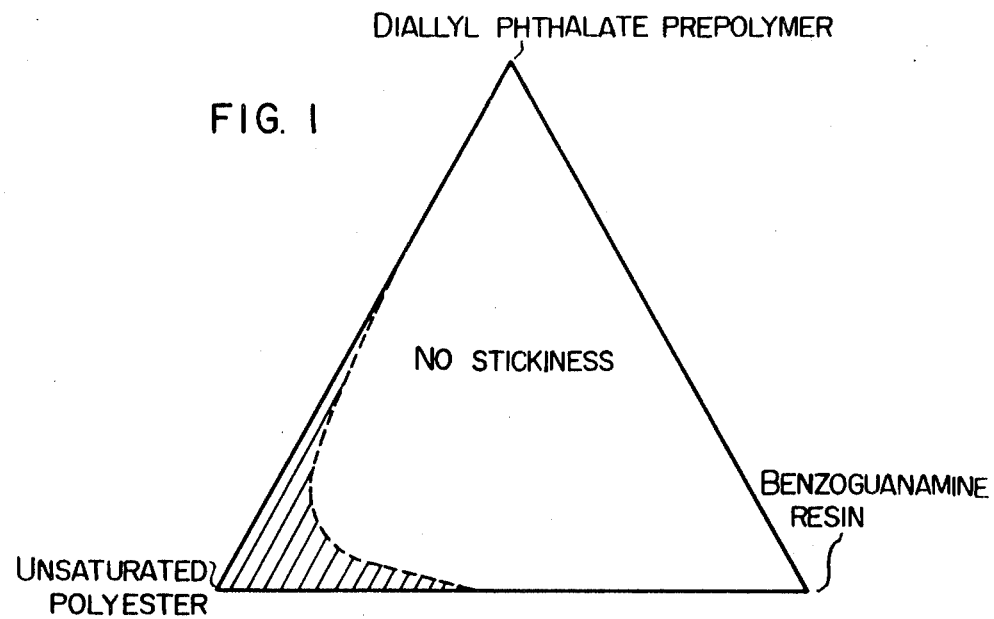

United States Patent [19]

Nakatsuka et al.

[11] 4,057,674
[45] Nov. 8, 1977

[54] PROCESS FOR PREPARING DRY, LAMINATING IMPREGNATED PAPERS OR CLOTHS, AND PROCESS FOR PRODUCING DECORATIVE PLATES USING THE SAME

[75] Inventors: Ryuzo Nakatsuka, Yokohama; Kenji Saito, Fujieda; Tadashi Kawamoto, Takatsuki, all of Japan

[73] Assignee: Sumitomo Bakelite Company, Limited, Tokyo, Japan

[21] Appl. No.: 564,060

[22] Filed: Apr. 1, 1975

Related U.S. Application Data

[63] Continuation of Ser. No. 359,461, May 11, 1973, abandoned.

[30] Foreign Application Priority Data

Nov. 2, 1972 Japan .................. 47-109398

[51] Int. Cl.² .............. B32B 27/06; B32B 27/10; C09J 5/00
[52] U.S. Cl. .................. 428/481; 156/331; 156/332; 260/850; 260/856; 427/391; 427/439; 428/530; 428/535; 428/482
[58] Field of Search .............. 156/308, 331, 313, 332, 156/330, 306, 307; 427/390, 439, 391; 428/481, 522, 482, 530, 514, 535; 260/834, 860, 835, 862, 850, 873, 856

[56] References Cited

U.S. PATENT DOCUMENTS

| | | | |
|---|---|---|---|
| 2,689,238 | 9/1954 | Thomas | 156/331 |
| 2,811,500 | 10/1957 | Coroier | 260/856 |
| 2,867,600 | 1/1959 | Coutras | 428/481 |
| 2,977,272 | 3/1961 | Pounds | 260/849 |
| 3,060,147 | 10/1962 | Schrecel | 156/330 |
| 3,131,088 | 4/1964 | Felstag | 156/332 |
| 3,154,454 | 10/1964 | Dupuis | 156/332 |
| 3,509,019 | 4/1970 | Beacham | 156/332 |

*Primary Examiner*—Charles E. Van Horn
*Assistant Examiner*—J. J. Gallagher
*Attorney, Agent, or Firm*—Karl W. Flocks

[57] ABSTRACT

In preparing a dry, laminating impregnated paper or cloth by impregnating a paper or cloth with a resin solution containing a polymerization catalyst, a cross-linking monomer and, if necessary, a releasing agent, followed by drying, the use as the resin of a resin composition consisting of (A) 10 to 90 % by weight of an organic solvent-soluble diallyl phthalate prepolymer having an average molecular weight of 2,000 to 20,000 and a softening point of 70° to 140° C. which prepolymer has been obtained by partially polymerizing a diallyl phthalate monomer and separating and purifying the resulting prepolymer, and 90 to 10 % by weight, in total, of (B) an organic solvent-soluble non-crystalline unsaturated polyester and (C) an organic solvent-soluble benzoguanamine resin obtained by condensing in an alkaline reaction system 1 mole of benzoguanamine with 1 to 4 moles of formaldehyde, the weight ratio of (C)/(B) being up to 0.85 and the amount of (C) being at least 2 % by weight of the total weight of (A), (B) and (C), results in a stickiness-free impregnated paper or cloth. The thus obtained impregnated paper or cloth is laminated to a proper base plate, or two or more of the impregnated paper or cloth are laminated to each other, to obtain a laminate with an overlay excellent in transparency. When the above-mentioned impregnated paper or cloth is used, a laminate having a favorable gloss can be obtained even when the laminate is taken out of the press without cooling at the time of lamination.

11 Claims, 2 Drawing Figures

PROCESS FOR PREPARING DRY, LAMINATING IMPREGNATED PAPERS OR CLOTHS, AND PROCESS FOR PRODUCING DECORATIVE PLATES USING THE SAME

This is a continuation, of application Ser. No. 359,461, filed May 11, 1973, now abandoned.

This invention relates to a process for preparing a dry, laminating impregnated paper or cloth by impregnating a paper or cloth with a synthetic resin solution, and then drying the impregnated paper or cloth, and to process for producing a decorative plate or sheet by laminating the said impregnated paper or cloth to a proper base plate or sheet.

It has heretofore been well known that impregnated papers or cloths of this kind are prepared by use of melamine resins, guanamine resins, phenol resins, diallyl phthalate resins or unsaturated polyester resins. All these papers or cloths impregnated with said resins are used for the production of decorative plates by laminating them to one another or to such plates or sheets as plywoods, hardboards or particle boards, and then hot-pressing the resulting laminates.

However, a paper or cloth impregnated with a melamine, guanamine or phenol resin has such disadvantages that it should be molded under high pressure at high temperatures, that it requires a long molding time, and that it greatly shrinks when cured at the time of molding to easily cause warp or form cracks in the resulting decorative plate. Further, in order to obtain a decorative plate having a favorable gloss, the decorative plate obtained by use of the impregnated paper or cloth is required to be cooled under pressure after the molding.

A diallyl phthalate resin-impregnated paper is also well known, and the use of this impregnated paper enables a part of the above-mentioned drawbacks to be removed. However, it still has such disadvantages that the resin is not only expensive but is also difficultly flowable at the time of molding.

An unsaturated polyester resin is also utilized for the preparation of an impregnated paper or cloth, and is conventionally used in the form of a liquid resin composition obtained by blending a non-crystalline unsaturated polyester resin with a liquid vinyl monomer. However, the resulting impregnated paper or cloth is extremely sticky, and hence is required to be handled with particular care.

With an aim to overcome the disadvantages of the above-mentioned impregnated papers or cloths, various attempts have been made by using, for example, a resin composition prepared by blending a non-crystalline unsaturated polyester resin with a diallyl phthalate resin, or a resin composition prepared by blending the said two components with an alkoxymethylamino resin or water-soluble melamine resin as a third component. However, the former impregnating resin composition is economically unsatisfactory, and the latter impregnating resin composition containing an alkoxymethylamino resin as the third component has such a disadvantage that the usable time thereof is as short as less than 50 hours, while the latter resin composition containing a water-soluble melamine resin as the third component has such disadvantages that the melamine resin is low in compatibility with the other two components, and not only the usable time of the resin composition is as extremely short as less than 10 hours but the transparency of the cured resin is also inferior.

An object of the present invention is to provide a process for preparing a non-sticky impregnated paper or cloth which is inexpensive and excellent in characteristics at the time of application and which has been freed from the disadvantages of the aforesaid conventional impregnated papers or cloths.

Another object of the invention is to provide a paper or cloth impregnated with a novel synthetic resin consisting of such three components as a diallyl phthalate prepolymer, an unsaturated polyester and a benzoguanamine resin.

A further object of the invention is to provide a process for producing a decorative plate or sheet by use of the above-mentioned impregnated paper or cloth.

Other objects and advantages of the invention will become apparent from the following description.

In accordance with the present invention, there is provided a process for preparing a dry, laminating impregnated paper or cloth, characterized by impregnating a paper or cloth with an impregnating solution containing a resin composition consisting of 10 to 90% by weight of a diallyl phthalate prepolymer and 90 to 10% by weight, in total, of an unsaturated polyester and a benzoguanamine resin, the weight ratio of benzoguanamine resin/unsaturated polyester being up to 0.85 and the amount of the benzoguanamine resin being at least 2% by weight of the composition, a crosslinking monomer, a polymerization catalyst and, if necessary, a releasing agent, and then drying the impregnated paper or cloth.

The present invention further provides a process for producing a decorative plate or sheet which comprises laminating two or more of the above-mentioned impregnated paper or cloth to each other, or laminating the above-mentioned impregnated paper or cloth to a base plate or sheet, and hot-pressing the resulting assembly.

The diallyl phthalate prepolymer used in the present invention is obtained by partially polymerizing a diallyl phthalate and then separating the resulting prepolymer from the partial polymerization product, followed by purification. It has an average molecular weight of 2,000 to 20,000 and a softening point of 70° to 140° C., and is soluble in ketones, aromatic hydrocarbons, etc. It is well known that such a prepolymer contains, in general, a slight amount of a diallyl phthalate or a lower alcohol-soluble low polymer.

As the unsaturated polyester, there is used a phthalic acid-based, isophthalic acid-based or bisphenol-based unsaturated polyester which is soluble in organic solvents. The phthalic acid-based or isophthalic acid-based unsaturated polyester is an unsaturated polyester having an acid value of 20 to 50 and containing phthalic acid or isophthalic acid or a mixture of the two in a proportion of 2.5 to 4.0 moles/kg. and an unsaturated dibasic acid in a proportion of 1.5 to 3.5 moles/kg. which is obtained by condensing a mixture of phthalic acid and/or isophthalic acid, an unsaturated dibasic acid and, if necessary, a cylic saturated dibasic acid with a polyhydric alcohol, the ratio of —OH/-COOH being 1.0 to 1.2. Examples of the unsaturated dibasic acid include maleic acid, fumaric acid, mesaconic acid, itaconic acid and citraconic acid. Examples of the cyclic saturated dibasic acid include phthalic acid, isophthalic acid, terephthalic acid, tetrahydrophthalic acid, endomethylene-tetrahydrophthalic acid, chlorendic acid, and anhydrides thereof. Examples of the polyhydric alcohol include ethylene glycol, propylene glycol, diethylene glycol, dipropylene glycol, glycerin, pentaerythritol and trimethylolpropane.

For the purpose of modification, it is possible to use, in addition to the above-mentioned dibasic acid and polyhydric alcohol, small amounts of a monobasic acid such as benzoic acid, tert-butyl benzoic acid or acetic acid, and a monohydric alcohol such as benzyl alcohol, furfuryl alcohol or tert-butyl alcohol.

As the bisphenol-based unsaturated polyester, there is used an unsaturated polyester having an acid value of 20 to 50 and containing an unsaturated dibasic acid in a proportion of 1.5 to 3.5 moles/kg. and a bisphenol-type diol in a proportion of 1.5 to 3.5 moles/kg. which is obtained by condensing an unsaturated dibasic acid, or a mixture thereof and a small amount of a cyclic saturated dibasic acid with an approximately equivalent amount of a bisphenol-type diol, or a mixture thereof and a small amount of a polyhydric alcohol. The above-mentioned bisphenol-type diol include, for example, hydrogenated bisphenols represented by the general formula,

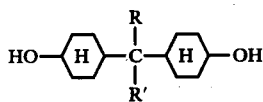

wherein R and R' are individually a group of the formula $-C_nH_{2n+1}$ wherein n is an integer of 0 to 4, or of the formula $-C_nH_{2n}\cdot COOH$ where n is an integer of 1 to 4, and oxyalkylenated bisphenols represented by the general formula,

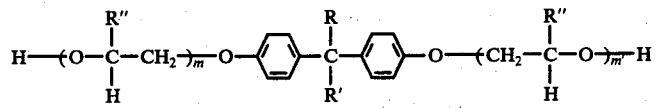

wherein R, R' and R'' are individually a group of the formula $-C_nH_{2n+1}$ wherein n is an integer of 0 to 4, and m and m' are individually an integer of 1 to 4. In preparing the bisphenol-based unsaturated polyesters, there may be used the same unsaturated dibasic acids, cyclic saturated dibasic acids and polyhydric alcohols as those used in the case of the aforesaid isophthalic acid-based unsaturated polyesters. Further, the bisphenol-based unsaturated polyesters may be modified with a small amount of a monobasic acid or a monohydric alcohol. These unsaturated polyesters are non-crystalline.

The benzoguanamine resin is a solid benzoguanamine resin soluble in ketones, aromatic hydrocarbons and alcohols which is obtained by reacting 1 mole of benzoguanamine with 1 to 4 moles, preferably 1.8 to 2.5 moles, of formaldehyde at a temperature in the range from 60° C. to the reflux temperature of the reaction mixture while adjusting the reaction system to a pH of 7 to 10, preferably 8 to 9, by addition of ammonium hydroxide, sodium hydroxide, sodium carbonate or triethanolamine, and dehydrating the resulting condensate under reduced pressure. The degree of condensation of this resin is determined by the intrinsic viscosity at 25° C. of a solution of 5 g. of the solid resin in 100 ml. of dioxane, and it is preferable that the resin has an intrinsic viscosity of about 0.033.

As is clear from the examples and compartive examples mentioned later, in case the amount of the diallyl phthalate prepolymer is less than 10% weight, the resin composition gives a sticky impregnated paper or a decorative plate inferior in gloss, while in case the amount of the said prepolymer exceeds 90% by weight, the resin composition becomes low in curing rate (thus gives a decorative plate inferior in solvent resistance, which is evaluated by dropping chloroform onto the decorative plate surface). In case the weight ratio of benzoguanamine resin/unsaturated polyester exceeds 0.85, the cured resin composition becomes inferior in compatibility, i.e. transparency, and the impregnating mixed resin composition becomes to have a short usable time. Further, in case the amount of the benzoguanamine resin is less than 2% by weight, there are brought about such disadvantages that the resin composition is inferior in solvent resistance and gives a sticky impregnated paper.

Figure 2:
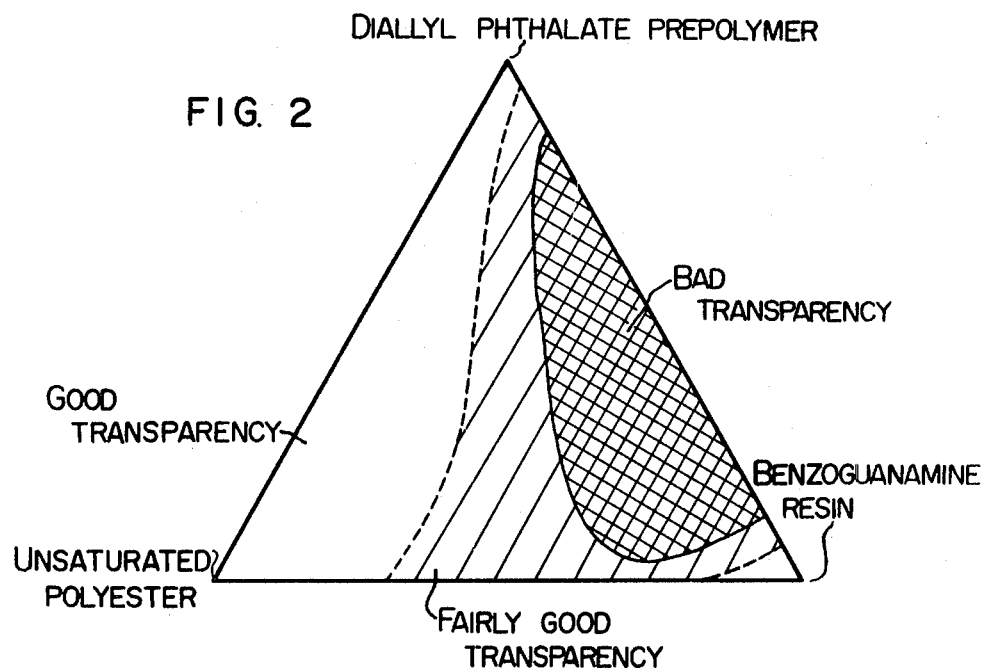

In the accompanying drawings, FIG. 1 shows the relation between the composition of a ternary resin composition consisting of a benzoguanamine resin, a phthalic acid-based unsaturated polyester as unsaturated polyester, and a diallyl phthalate prepolymer, and the stickiness of a paper impregnated with said resin composition; and FIG. 2 shows the relation between the composition of the same resin composition as in FIG. 1 and the transparency of said resin composition which has been cured.

The crosslinking monomer used in the present invention is preferably a diallyl phthalate, though is not limited thereto, and any crosslinking monomer may be used so far as it is difficult to volatilize at the drying step subsequent to the impregnation. The amount of the crosslinking monomer is preferably 2 to 20 parts by weight per 100 parts by weight of the mixed resin composition.

As the polymerization catalyst, there is used such a radical polymerization initiator as an organic peroxide, e.g. benzoyl peroxide, dichlorobenzoyl peroxide, tert-butyl perbenzoate or di-tert-butyl peroxide; an azo compound, e.g. azobisisobutyronitrile; or a mixture of said compounds. The amount of the polymerization catalyst is 1 to 10 parts by weight, preferably 2 to 6 parts by weight, per 100 parts by weight of the mixed resin composition.

In the present invention, the diallyl phthalate prepolymer, the unsaturated polyester, the benzoguanamine resin, the crosslinking monomer and the polymerization initiator are dissolved in a volatile solvent such as a ketone, e.g. acetone or methyl ethyl ketone; an aromatic hydrocarbon, e.g. benzene or toluene; an ester, e.g. ethyl acetate; an alcohol, e.g. methyl alcohol; or a mixture of said solvents, and the resulting solution is incorporated, if necessary, with a colorant, a releasing agent and other additives to form an impregnating resin solution. This resin solution is usable over a period of more than one week, and a resin solution containing no polymerization catalyst can be used over a longer period of time.

According to the present invention, a paper or cloth may be impregnated under ordinary conditions. Further, the amount of the resin composition applied to the impregnated paper or cloth may also be an ordinary amount, and is 60 to 90% in the case of an overlay paper and 35 to 70% in the case of a decorative impregnated paper, though the value varies depending on the application purpose of the impregnated paper. The volatile content of the impregnated paper is also controlled depending on the application purpose thereof. As the material to be impregnated with the resin composition, there is used a sheet-like material such as paper, cloth or unwoven fabric. The resulting impregnated paper or cloth is non-sticky and can be molded at a low temperature within a short period of time, and the molded article is excellent in gloss even if it is taken out without cooling, and is suitable for use in the so-called hot-hot cycle. The impregnated paper or cloth is storable for several months.

In producing a decorative plate or sheet, the impregnated paper or cloth is laminated by hot-pressing to such a base plate or sheet as plywood, hardboard, particle board, asbestos-cement plate or gypsum board, or two or more of the impregnated paper or cloth are laminated by hot-pressing to each other. Ordinarily, the molding temperature is 110° to 170° C., and the molding pressure is 5 to 50 kg/cm². Other conditions including the molding time are properly decided.

The resulting decorative plate or sheet is excellent in surface transparency, gloss and solvent resistance, high in flexibility and less in warp. Thus, according to the present invention, decorative plates or sheets having high industrial values can be obtained at low cost. These decorative plates or sheets are useful as interior decoration materials, panel materials, furniture materials, edge materials, etc.

The present invention is illustrated in more detail below with reference to examples, but the invention is not limited to these examples. In the examples, all % and parts are by weight, unless otherwise specified.

EXAMPLE 1

In a carbon dioxide atmosphere, 6 moles of phthalic anhydride, 4 moles of maleic anhydride and 10.5 moles of propylene glycol were subjected to condensation until an acid value of 30 was reached to obtain an unsaturated polyester. Subsequently, 1 mole of benzoguanamine was reacted under reflux at a pH of 9 with 37% formalin (2 moles in terms of formaldehyde), and the reaction product was dehydrated under reduced pressure to obtain a solid benzoguanamine resin. A mixture of 20 parts of the unsaturated polyester resin, 10 parts of the benzoguanamine resin, 70 parts of a diallyl phthalate prepolymer (molecular weight 6,000), 3 parts of benzoyl peroxide, 15 parts of a diallyl phthalate monomer and 3 parts of a releasing agent (lauric acid) was dissolved in 100 parts of acetone to form a varnish. Thereafter, a decorative paper was impregnated with the said varnish so as to have a resin content of 55%, and then dried to prepare an impregnated paper. This impregnated paper was placed on a plywood of 4 mm. in thickness, and then pressed with heating at 130° C. under a pressure of 10 Kg/cm² for 3 minutes in one case and for 15 minutes in the other case to obtain a laminated plywood. Various characteristics of the laminated plywood were as set forth in Table 1.

For comparison, laminated plywoods were prepared in the same manner as above, except that:
1. the diallyl phthalte prepolymer was used in a smaller proportion (comparative Example 1),
2. the benzoguanamine resin was used in a larger proportion (Comparative Example 2),
3. the diallyl phthalate prepolymer was used in a larger proportion (Comparative Example 3),
4. the benzoguanamine resin was used in a larger proportion, and the unsaturated polyester resin was not used (Comparative Example 4), and
5. the benzoguanamine resin was used in a larger proportion, and the diallyl phthalate prepolymer was not used (Comparative Example 5). Various characteristics of the thus prepared plywoods were also shown in Table 1.

From Table 1, it is understood that even when molded under a low pressure for a short period of time, the impregnated paper according to the present invention gives a laminated plywood excellent in gloss and chemical resistance and less in wrap.

Table 1

| | Resin composition | | | Molded at 130° C., 10 Kg/cm² for 3 minutes | | | | | Molded at 130° C., 10 Kg/cm² for 15 minutes | | | | |
|---|---|---|---|---|---|---|---|---|---|---|---|---|---|
| | Unsaturated polyester (parts) | Benzoguanamine resin (parts) | Diallyl phthalate prepolymer (parts) | Transparency | Gloss | Solvent resistance (1) | Gross-cut test (2) | Warp (3) | Transparency | Gloss | Solvent resistance (1) | Gross-cut test (2) | Warp (3) |
| Example 1 | 20 | 10 | 70 | Good | Good | Good | 0 | 7 | Good | Good | Good | 0 | 10 |
| Comparative Example 1 | 80 | 15 | 5 | Good | Poor | Good | 0 | 10 | Good | Poor | Good | 0 | 20 |
| Comparative Example 2 | 10 | 80 | 10 | No decorative plate could be produced | | | | | Poor | Good | Good | 10 | 25 |
| Comparative Example 3 | 3 | 2 | 95 | Good | Good | Poor | 8 | 5 | Good | Good | Good | 0 | 10 |
| Comparative Example 4 | 0 | 80 | 20 | No decorative plate could be produced | | | | | Poor | Good | Good | 10 | 25 |
| Comparative Example 5 | 20 | 80 | 0 | No decorative plate could be produced | | | | | Poor | Good | Good | 10 | 35 |

Notes:
(1) The solvent resistance test was carried out by dropping chloroform onto the surface of the decorative plate, covering the plate with a watch glass, allowing the plate to stand for 1 hour and then observing the change in appearance of the plate.
(2) The cross-cut test was carried out by scratching the surface coating of the decorative plate with a knife so as to form 100 squares, adhering a cellophane adhesive tape onto the surface coating, peeling off the adhesive tape from the surface coating and counting the number of delaminated squares.
(3) The numeral representing the warp is the height (cm) of maximum warp of the laminated plywood of 90 × 1,800 cm.

EXAMPLE 2

In a nitrogen atmosphere, 5 moles of maleic anhydride, 5 moles of isophthalic acid and 11 moles of propylene glycol were subjected to condensation until an acid value of 30 was reached to obtain an unsaturated polyester resin. A mixture of 50 parts of the said unsaturated polyester resin, 30 parts of the benzoguanamine resin obtained in Example 1, 20 parts of the diallyl phthalate prepolymer used in Example 1, 2.5 parts of tert-butyl perbenzoate, 15 parts of diallyl phthalate monomer and 2 parts of a releasing agent (lauric acid) was dissolved at room temperature in 100 parts of methyl ethyl ketone to form a varnish. Thereafter, an overlay paper of 2 mils in thickness was impregnated with the said varnish so as to have a resin content of 80% to prepare an impregnated paper. This impregnated paper was laminated to a hardboard of 5 mm. in thickness at 150° C. under 10 kg/cm$^2$ for 10 minutes to obtain a molded plate. Characteristics of the thus obtained plate were as set forth in Table 2.

obtain an unsaturated polyester. Using this unsaturated polyester, an impregnated paper was prepared in the same manner as in Example 1. The thus prepared impregnated paper was placed on a plywood of 4 mm. in thickness and hot-pressed at 130° C. under 10 Kg/cm$^2$ for 5 minutes to obtain a decorative plate. This decorative plate was excellent in gloss, transparency and solvent resistance.

EXAMPLES 5–7

The benzoguanamine resin obtained in Example 1, the unsaturated polyester obtained in Example 4 and a diallyl phthalate prepolymer were mixed together in such proportions as shown in Table 4 to form resin compositions. Each of the thus formed resin compositions, 3

Table 2

| | Resin composition | | | Molded at 150° C., 10 Kg/cm$^2$ for 10 minutes | | | |
|---|---|---|---|---|---|---|---|
| | Unsaturated polyester (parts) | Benzo-guanamine resin (parts) | Diallyl phthalate prepolymer (parts) | Trans-parency | Gloss | Chemical resistance | Warp |
| Example 2 | 50 | 30 | 20 | Good | Good | Good | 10 |
| Comparative Example 6 | 30 | 30 | 40 | Poor | Good | Poor | 10 |
| Comparative Example 7 | 70 | 30 | 0 | Good | Poor | Good | 20 |
| Comparative Example 8 | 20 | 30 | 50 | Poor | Good | Poor | 10 |
| Comparative Example 9 | 10 | 30 | 60 | Poor | Fair | Good | 20 |

EXAMPLE 3

A printed paper of 80 g/m$^2$ in basis weight was impregnated with the same resin composition as in Example 1, except that the proportions of the unsaturated polyester, benzoguanamine resin and diallyl phthalate prepolymer were varied to 60 parts, 20 parts and 20 parts, respectively, and was then dried to obtain an impregnated paper having a resin content of 60% and a volatile content (VC) of 3%.

For comparison, impregnated papers were prepared in the same manner as above, except that the proportions of the individual resins were varied as shown in Table 3 (Comparative Examples 10 and 11). The impregnated paper of Comparative Example 11 was sticky.

These impregnated papers were individually laminated to a particle board of 20 mm. in thickness to produce decorative plates. Characteristics of the thus produced decorative plates were as set forth in Table 3.

parts of benzoyl peroxide 15 parts of diallyl phthalate monomer and 3 parts of a releasing agent (lauric acid) were dissolved in 150 parts of acetone to prepare impregnating resin solutions (Examples 5 to 7).

An overlay non-woven cloth of 20 g/m$^2$ in basis weight, a printed decorative paper of 100 g/m$^2$ in basis weight and a kraft paper of 150 g/m$^2$ in basis weight were individually impregnated with each of the above-mentioned resin solutions so as to have resin contents of 85%, 50% and 45%, respectively, and were then dried to prepare impregnated papers. These impregnated papers were individually combined together according to an ordinary procedure, and then hot-pressed under such hot-pressing conditions as a temperature of 120° C., a pressure of 8 Kg/cm$^2$ and a time of 15 minutes, and the resulting decorative sheets were taken out of the press without cooling.

For comparison, a decorative sheet was produced in the same manner as above, except that the composition of the resin solution was as shown in Table 4 (Comparative Example 12).

Table 3

| | Resin composition | | | Properties | | | |
|---|---|---|---|---|---|---|---|
| | Unsaturated polyester (parts) | Benzo-guanamine resin (parts) | Diallyl phthalate prepolymer (parts) | Trans-parency | Gloss | Solvent resistance | Warp |
| Example 3 | 60 | 20 | 20 | Good | Good | Good | 1.5 |
| Comparative Example 10 | 10 | 20 | 70 | Poor | Good | Fair | 1.5 |
| Comparative Example 11 | 80 | 20 | 0 | Good | Poor | Good | 3.0 |

EXAMPLE 4

8 Moles of fumaric acid, 2 moles of isophthalic acid and 11 moles of diethylene glycol were subjected to condensation until an acid value of 35 was reached to Characteristics of the thus produced decorative sheets were as set forth in Table 4. The paper impregnated with the resin solution of the composition adopted in Comparative Example 12 was sticky.

Table 4

| | Resin composition | | | Molded at 120° C., 8 Kg/cm² for 15 minutes | | |
|---|---|---|---|---|---|---|
| | Unsaturated polyester (parts) | Benzo-guanamine resin (parts) | Diallyl phthalate prepolymer (parts) | Trans-parency | Solvent resistance | Flexibility |
| Example 5 | 60 | 10 | 30 | Good | Good | 10 |
| Example 6 | 70 | 10 | 20 | Good | Good | 12 |
| Example 7 | 80 | 10 | 10 | Good | Good | 15 |
| Comparative Example 12 | 70 | 0 | 30 | Good | Good | 12 |

Note:
The flexibility shows a minimum flexible radius (mm).

What we claim is:

1. A process for producing a dry, impregnated laminating paper or cloth comprising the steps of:
   1. impregnating a paper or cloth with a solution of mixed resins in an organic solvent in one step, said resin solution comprising
      a radical polymerization catalyst, a crosslinking monomer, optionally a releasing agent, and a ternary resin composition consisting of
      A. 10 to 90% by weight of an organic solvent-soluble diallyl phthalate prepolymer having an average molecular weight of 2,000 to 20,000 and a softening point of 70° to 140° C., which prepolymer has been obtained by partially polymerizing a diallyl phthalate monomer and separating and purifying the resulting prepolymer, and
      90 to 10% by weight, in total, of (B) an organic solvent-soluble non-crystalline unsaturated polyester and
      C. an organic solvent-soluble benzoguanamine resin obtained by condensing in an alkaline reaction system 1 mole of benzoguanamine with 1 to 4 moles of formaldehyde, the weight ratio of (C)/(B) being up to 0.85 and the amount of (C) being at least 2% by weight of the total weight of (A), (B) and (C); and
   (2) then drying the thus impregnated paper or cloth.

2. A process according to claim 1, wherein the unsaturated polyester is a phthalic acid-based unsaturated polyester having an acid value of 20 to 50, which is obtained by condensing a mixture of phthalic acid and an unsaturated dibasic acid with a polyhydric alcohol, the ratio of —OH/-COOH being from 1.0 to 1.2.

3. A process according to claim 2, wherein the phthalic acid is isophthalic acid.

4. A process according to claim 1, wherein the unsaturated polyester is a bisphenol-based unsaturated polyester having an acid value of 20 to 50, which is obtained by condensing an unsaturated dibasic acid with a hydrogenated bisphenol or an oxyalkylenated bisphenol.

5. A process according to claim 1 wherein the benzoguanamine resin is a resin obtained by condensing 1 mole of benzoguanamine with 1.8 to 2.5 moles of formaldehyde.

6. A process according to claim 1 wherein the resin composition consists of (A) 10 to 70% by weight of a diallyl phthalate prepolymer, and 90 to 30% by weight, in total, of (B) an unsaturated polyester and (C) a benzoguanamine resin, the weight ratio of (C)/(B) being up to 35/65 and the amount of (C) being at least 2% by weight of the total weight of (A), (B) and (C).

7. A storable impregnated paper or cloth showing no substantial stickiness and capable of melting and curing at the subsequent hot-pressing step which is obtained according to the process set forth in claim 1.

8. A process for producing a decorative plate or sheet which comprises placing one or more sheets of impregnated paper or cloth of claim 7 on a base plate or sheet and then hot-pressing the resulting assembly.

9. A process according to claim 8, wherein the hot-pressed assembly is taken out of the press after the hot-pressing without cooling.

10. A decorative plate or sheet obtained according to the process set forth in claim 8.

11. A decorative plate or sheet obtained according to the process set forth in claim 9.

* * * * *